United States Patent
Gfeller et al.

(10) Patent No.: US 6,823,284 B2
(45) Date of Patent: Nov. 23, 2004

(54) GEOLOCATION SUBSYSTEM

(75) Inventors: Fritz Gfeller, Bonstetten (CH); Pierre Chevillat, Kilchberg (CH); Wolfgang Schott, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 74 days.

(21) Appl. No.: 10/408,171

(22) Filed: Apr. 4, 2003

(65) Prior Publication Data

US 2003/0222817 A1 Dec. 4, 2003

(30) Foreign Application Priority Data

Apr. 30, 2002 (EP) .......................................... 02009752

(51) Int. Cl.⁷ .......................... G04F 1/00; G04F 10/00
(52) U.S. Cl. ...................................................... 702/176
(58) Field of Search ................................ 702/176, 127

(56) References Cited

U.S. PATENT DOCUMENTS

| | | | | | |
|---|---|---|---|---|---|
| 4,685,075 A | * | 8/1987 | Morita et al. | ............... | 702/176 |
| 6,154,456 A | * | 11/2000 | Rakib et al. | ................ | 370/342 |
| 6,665,333 B2 | * | 12/2003 | McCrady et al. | ........... | 375/147 |
| 2002/0039904 A1 | * | 4/2002 | Anderson | .................... | 455/456 |
| 2002/0080069 A1 | * | 6/2002 | Stilp et al. | .................. | 342/387 |
| 2002/0101375 A1 | * | 8/2002 | Stilp et al. | .................. | 342/465 |
| 2002/0155845 A1 | * | 10/2002 | Martorana | .................. | 455/456 |
| 2002/0183069 A1 | * | 12/2002 | Myr | ........................... | 455/456 |
| 2003/0017832 A1 | * | 1/2003 | Anderson et al. | ........... | 455/456 |
| 2003/0069033 A1 | * | 4/2003 | Edge et al. | ................. | 455/502 |
| 2003/0092448 A1 | * | 5/2003 | Forstrom et al. | ........... | 455/456 |
| 2003/0156603 A1 | * | 8/2003 | Rakib et al. | ................ | 370/485 |

* cited by examiner

*Primary Examiner*—John Barlow
*Assistant Examiner*—Demetrius R. Pretlow
(74) *Attorney, Agent, or Firm*—Louis P. Herzberg (57) ABSTRACT

The present invention provides apparatus and methods for determining a propagation time of a signal transmitted from a first location to a second location as a request signal and received as a response signal by the first location via a channel. In an example embodiment, a method comprises the step of determining the propagation time of the signal based on a local counter value that represents the time between transmission of the request signal and reception of the response signal, a remote counter value that depends on the request signal and being known to the first location, and a determinable time-delay value. The remote counter value represents an inter-time-delay between the reception of the request signal and the start of transmission of the response signal at the second location.

18 Claims, 5 Drawing Sheets

GEOLOCATION SUBSYSTEM

FIELD OF THE INVENTION

The present invention is directed to determining propagation time of a signal and/or line-of-sight (LOS) signal propagation time. More particularly, the invention allows determining the distance between stations and also the location of a station.

BACKGROUND OF THE INVENTION

Systems for measuring the line-of-sight (LOS) distance between wireless stations have been developed. For example, the Global Positioning System (GPS) represents an already widespread application. However, it represents a self-contained system of providing worldwide geolocation information without the possibility of transmitting user data. Within buildings where most of the envisioned applications are targeted GPS signals may often not be received.

Wireless local area networks (LANs) such as IEEE 802.11x or Hiperlan have been designed for data communication and have found widespread acceptance and proliferation in the industry. However, no provisions have been made for augmenting these systems with geolocation functions. A particular disadvantage is the lack for accurate determination of timing events with respect to propagation time measurements. The IEEE 802.11 MAC specifications relies on a timing resolution for network synchronization and medium access of 1 $\mu$s. This corresponds to a propagation distance of 300 m. Furthermore, SIFS (Short InterFrame Space) as the shortest time interval between two frames on the medium is defined as SIFS=16 $\mu$s with a tolerance of ±0.9 $\mu$s according to IEEE 802.11a. This timing resolution, and even more so the corresponding absolute tolerances, render it useless for extracting sufficiently accurate timing information to support geolocation functions.

From the above follows that there is still a need in the art for an improved determination of accurate and sufficient timing information with respect to a signal or frame exchange between stations. Moreover, the determination of the position location of a station within a local area network with an accuracy of a few meters is desired.

SUMMARY OF THE INVENTION

Thus the present invention provides methods and apparatus for determining propagation time of a signal (transmit signal) transmittable via a channel, such as a request signal and a response signal. In an example embodiment, an apparatus comprises a timing-control unit for starting a local timer providing a local counter value when transmission of the request signal begins, a correlator for determining a timing reference or time event within the reception of the response signal, and a general-control unit coupled to the timing-control unit and the correlator for stopping the local timer in response to the detection of the timing reference by the correlator. Often, the general-control unit is adapted to derive the propagation time of the signal based on the local counter value, a remote counter value that depends on the request signal, and a determinable time-delay value. The remote counter value represents an inter-time-delay between the reception of the request signal and the start of transmission of the response signal. The propagation distance between a requesting station and a responding station, can be calculated easily by multiplying the propagation time, with the speed of light.

The present invention solves the problem of inaccurate and insufficient timing information with respect to a frame exchange separated by a short interframe space (SIFS) interval. Sufficiently accurate timing events relating to the reception of the frames are derived from correlation peaks generated by the correlation of frame-inherent training sequences, and time delays are implemented with hardware-controlled clocks using length of frame and data rate parameters transmitted during the frame exchange. The invention in its basic form requires no modification of the IEEE 802.11 standard. Position location with accuracy of a few meters can be achieved.

In general, the invention allows the furnishing of an existing and well-established wireless local area network (LAN) technology with an additional geolocation function for establishing the location of participating stations or mobile terminals. In particular, the invention relates to an apparatus and method for measuring the line-of-sight (LOS) signal propagation time, and hence the distance, between two stations, operating for example, under the IEEE 802.11 wireless LAN protocol. With a sufficient number of distance measurements between, for example, a mobile station and other stations or access points (APs) with known position coordinates the position of the mobile station can be determined.

In accordance with a second aspect of the present invention, there is provided a method for determining a propagation time of a signal (transmit signal) transmitted from a first location to a second location as a request signal and received as a response signal by the first location via a channel. In an example embodiment, a method comprises the step of determining the propagation time of the signal based on a local counter value that represents the time between transmission of the request signal and reception of the response signal, a remote counter value that depends on the request signal and being known to the first location, and a determinable time-delay value. The remote counter value represents an inter-time-delay between the reception of the request signal and the start of transmission of the response signal at the second location.

In accordance with a third aspect of the present invention, there is provided a method for determining a propagation time of a signal transmitted from a first location to a second location as a request signal and received as a response signal by the first location via a channel. An example method comprises the steps of starting a local timer providing a local counter value at the first location when transmission of the request signal begins, determining a timing reference within the reception of the response signal, stopping the local timer in response to the detection of the timing reference, and deriving the propagation time of the signal based on the local counter value, a remote counter value depending on the request signal and being known to the first location, and a determinable time-delay value. Thereby, the remote counter value represents an inter-time-delay between the reception of the request signal and the start of transmission of the response signal at the second location.

DESCRIPTION OF THE DRAWINGS

Preferred embodiments of the invention are described in detail below, by way of example only, with reference to the following schematic drawings.

The drawings are provided for illustrative purpose only and do not necessarily represent practical examples of the present invention to scale.

DETAILED DESCRIPTION OF THE INVENTION

The present invention provides methods and apparatus for determining a propagation time of a signal (transmit signal) transmittable via a channel as a request signal and a response signal. In an embodiment, an apparatus comprises a timing-control unit for starting a local timer providing a local counter value when transmission of the request signal begins, a correlator for determining a timing reference or time event within the reception of the response signal, and a general-control unit coupled to the timing-control unit and the correlator for stopping the local timer in response to the detection of the timing reference by the correlator. The general-control unit is often adapted to derive the propagation time of the signal based on the local counter value, a remote counter value that depends on the request signal, and a determinable time-delay value. The remote counter value represents an inter-time-delay between the reception of the request signal and the start of transmission of the response signal.

The propagation distance between a requesting station, herein also referred to as initiator station, and a responding station, herein also referred to as responder station, can be calculated easily by multiplying the propagation time, herein also referred to as propagation time of the signal, with the speed of light.

This invention solves the problem of inaccurate and insufficient timing information with respect to a frame exchange separated by a short interframe space (SIFS) interval. Sufficiently accurate timing events relating to the reception of the frames are derived from correlation peaks generated by the correlation of frame-inherent training sequences, and time delays are implemented with hardware-controlled clocks using length of frame and data rate parameters transmitted during the frame exchange. The invention in its basic form requires no modification of the IEEE 802.11 standard. Position location with accuracy of a few meters can be achieved.

A distance measurement between two stations uses both the measurement of the signal propagation time and the exchange of information, e.g. an individual source (SA) and destination address (DA), about the identity of the two stations involved. As a means for measuring propagation time and establishing station identity the invention uses the exchange of two directed frames (frame I and frame II) using the short interframe space (SIFS) as prescribed in the IEEE 802.11 protocol. Such frame exchanges are for instance "Request-to-Send" (RTS)/"Clear-to-Send" (CTS), or "Data"/"Acknowledgement" (ACK). Frame exchanges using a SIFS interval are defined for all operational modes of the IEEE 802.11 protocol, i.e. point control function (PCF), distributed control function (DCF), or power save (PS) mode thus allowing propagation time measurements in all situations. The timing signals are derived from correlation sequences contained in the preambles of the frames. With suitable precise clocking circuits and exchange of additional timing information inherent to the used frame structure the timing of the frame exchange can be improved over the capabilities defined in the IEEE 802.11 standard description to allow for a meaningful estimation of the signal propagation time.

In general, the invention allows to furnish an existing and well-established wireless local area network (LAN) technology with an additional geolocation function for establishing the location of participating stations or mobile terminals. In particular, the invention relates to an apparatus and method for measuring the line-of-sight (LOS) signal propagation time, and hence the distance, between two stations, operating for example, under the IEEE 802.11 wireless LAN protocol. With a sufficient number of distance measurements between, for example, a mobile station and other stations or access points (APs) with known position coordinates the position of the mobile station can be determined.

By incorporating the timing-control unit, also referred to as geolocation subsystem, into IEEE 802.11 based stations a whole new range of services may be added to the underlying network functionality. These are a few examples to illustrate the possibilities:

tracking of persons equipped with the corresponding devices in building complexes, tracking of equipment (operating in power-save mode), applications with location awareness, e.g. mobile stations in an exhibition environment, where downlink information transmitted is dependent on location.

Combining the services of a wireless communication network based on established technology with the additional geolocation function with little or no modification to the existing and proven IEEE 802.11 standard may provide the required differentiator for ubiquitous deployment.

It is further advantageous to adapt the timing-control unit to the IEEE 802.11g standard extension, which is defined to operate in the 2.4 GHz band using an Orthogonal Frequency Division Multiplexing (OFDM) transmission scheme. An example embodiment of a timing-control unit comprises a timer unit having a clock unit that clocks the local timer. Depending on the clock rate the accuracy for determining the propagation time can be adjusted.

The timing-control unit in some embodiment further comprises two registers and a comparator, wherein one of the two registers and the comparator are connected to the timer unit. Such an arrangement has the advantage of an easy design for comparing a scheduled value with an actual value in order to define a precise start of the transmission of the response signal.

The apparatus can be in an initiator mode and a responder mode. This allows to use the same entity or hardware twice, i.e. for sending out the request signal and for receiving the response signal. An easier implementation can therefore be achieved. When the responder mode is a default, then the advantage occurs that the apparatus or station is able to receive a request signal and to respond quickly with the response signal.

The apparatus can have a scheduling means for scheduling transmission of the response signal upon reception of the request signal. The scheduling means which basically is provided within the general-control unit allows an exact scheduling between the reception of the request signal and the start of transmission of the response signal. It is advantageous if signals with a constant or fixed length, e.g. Request-to-Send (RTS) or Clear-to-Send (CTS), are used, because then an easier processing is possible as the transmission time of the response signal is identical and does not need to be calculated for every new response signal.

The accuracy and resolution of the distance measurement depends on the timing accuracy of the correlation signals received. For improving the timing accuracy the bandwidth of the signal and hence the chip rate of the correlation sequence can be increased. When the correlator uses a sampling frequency of approximately 40 MHz then a spatial or distance resolution of about 3.75 m is achievable. Using a 20 MHz sampling frequency leads to a resolution of about 7.5 m. With well-designed sequences having a good auto-correlation and low cross-correlation properties further improvements in the timing accuracy can be achieved.

In accordance with another embodiment of the present invention, there is provided a method for determining a propagation time of a signal transmitted from a first location to a second location as a request signal and received as a response signal by the first location via a channel. The method comprises the step of determining the propagation time of the signal based on a local counter value that represents the time between transmission of the request signal and reception of the response signal, a remote counter value that depends on the request signal and being known to the first location, and a determinable time-delay value. The remote counter value represents an inter-time-delay between the reception of the request signal and the start of transmission of the response signal at the second location.

In accordance with still another embodiment of the present invention, there is provided a method for determining a propagation time of a signal transmitted from a first location to a second location as a request signal and received as a response signal by the first location via a channel. The method comprises the steps of starting a local timer providing a local counter value at the first location when transmission of the request signal begins, determining a timing reference within the reception of the response signal, stopping the local timer in response to the detection of the timing reference, and deriving the propagation time of the signal based on the local counter value, a remote counter value depending on the request signal and being known to the first location, and a determinable time-delay value. Thereby, the remote counter value represents an inter-time-delay between the reception of the request signal and the start of transmission of the response signal at the second location.

In some embodiments, the step of determining a timing reference within the reception of the response signal can further comprise the generation of a correlation signal, e.g. a peak. By doing so an accurate time reference or time event can be used for the further processing.

In a responder mode, the transmission of the response signal is scheduled as soon as the request signal is received. This has the advantage that the moment of the transmission of the response signal can be planned and calculated immediately.

Figure 1:
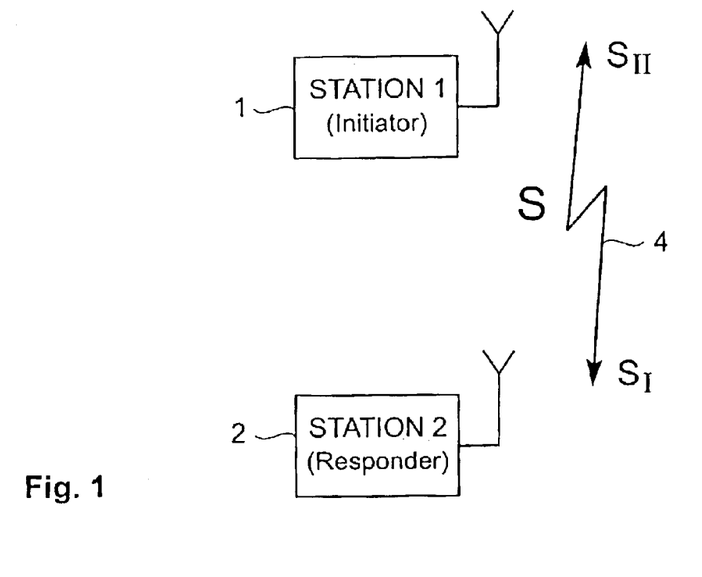
FIG. 1 shows a schematic illustration of a communication environment with an initiator location and a responder location.

With reference to FIG. 1, a general layout of a communication environment is described in which a geolocation subsystem can be used. In the figures, same reference signs are used to denote the same or like parts. FIG. 1 shows a first station 1, hereafter referred to as initiator station 1, and a second station 2, hereafter referred to as responder station 2. The initiator station 1 is located at a first location while the responder station 2 is located at a second location. Multiple of the responder station 2 can be arranged (not shown) with the advantage that the location of the initiator station 1 can be derived more accurately. For the determination of the distance between the initiator station 1 and the responder station 2, these two stations 1, 2 are sufficient. However, for the determination of a two-dimensional location of the initiator station 1 at least two responder stations should be used. For the determination of a three-dimensional location of the initiator station 1 at least three or more responder stations should be applied. As indicated in FIG. 1, a signal S can be transmitted via a channel 4 as a request signal $S_I$ and response signal $S_{II}$. Usually, the signal S comprises a frame or several frames. That means here, that the request signal $S_I$ comprise a first frame I, also referred to as initiator transmitting frame I, while the response signal $S_{II}$ comprise a second frame II, also referred to as responder transmitting frame II. The presented embodiment relates to providing the IEEE 802.11a standard supporting an Orthogonal Frequency Division Multiplexing (OFDM) transmission scheme in the 5 GHz band with variable data rates (6 Mbit/s to 54 Mbit/s) with the geolocation subsystem capable of estimating the transmission or propagation distance $S_p$ between the initiator station 1 and the responder station 2.

Figure 2:
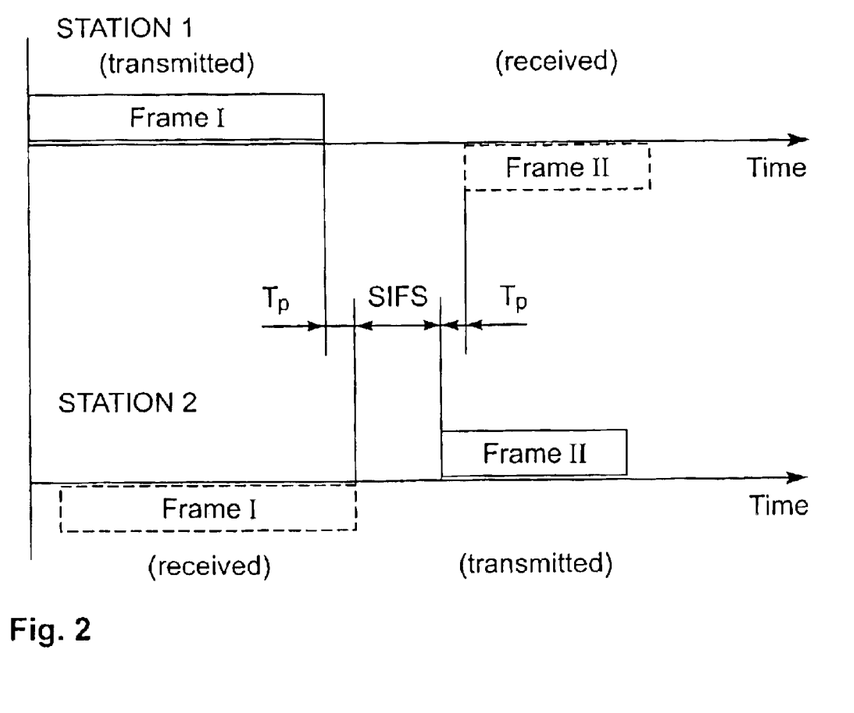
FIG. 2 shows a schematic illustration of transmitted frames over time sent and received by the initiator and responder locations.

FIG. 2 shows a schematic illustration of an example of an initiator transmitting frame I, labeled as Frame I, and the responder transmitting frame II, labeled as Frame II, over time sent and received by the initiator station 1 and the responder station 2. It can be seen that the transmitted initiator transmitting frame I sent from the initiator station 1 is received by the responder station 2 with a propagation delay or propagation time $T_p$. It can be further seen that the responder transmitting frame II sent from the responder station 2 after a short interframe space SIFS is received by the initiator station 1 also with the propagation delay $T_p$.

Figure 3:
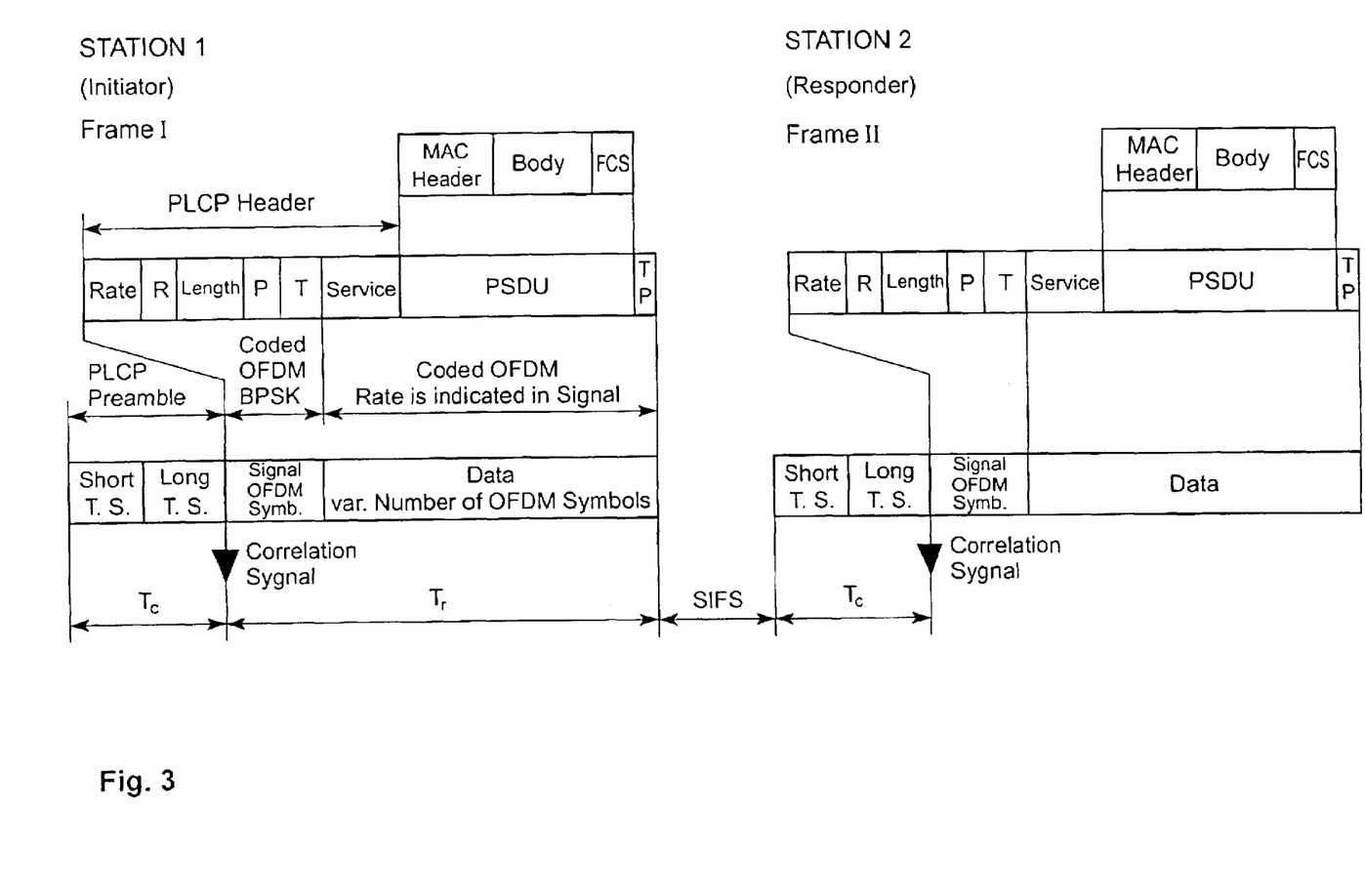
FIG. 3 shows a schematic illustration of an initiator transmitting frame and a responder transmitting frame according to IEEE 802.11a MAC specifications.
Figure 6:
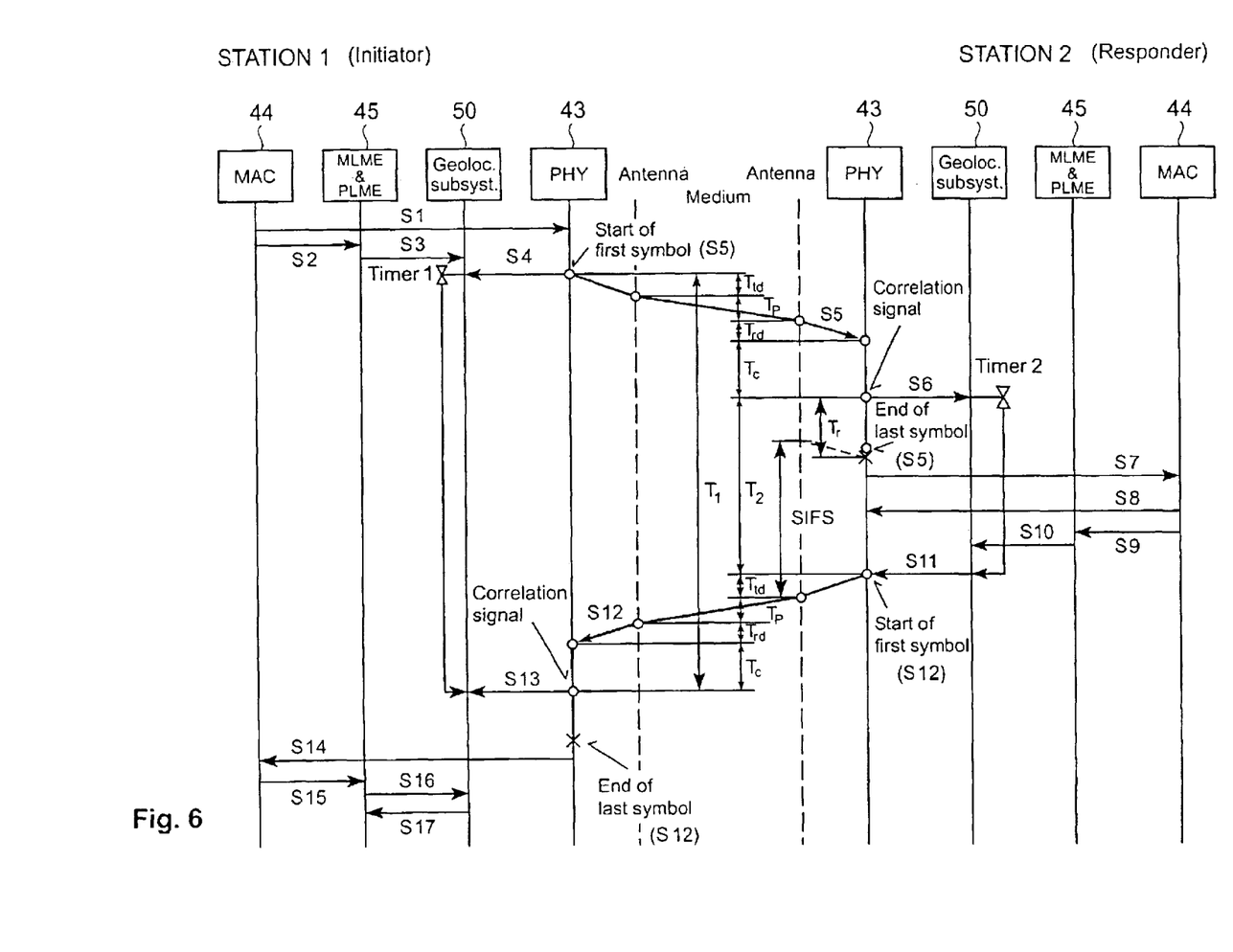
FIG. 6 shows a schematic illustration of an example embodiment of a signal flow in a message sequence chart.

FIG. 3 shows a schematic illustration of the initiator transmitting frame I and the responder transmitting frame II in more detail. The shown frame structure is based on IEEE 802.11a. Information about the identity of the two stations, i.e. the initiator station 1 and the responder station 2, is exchanged via the individual source address (SA) and destination address (DA) contained in the Medium Access Control (MAC) header of the initiator transmitting frame I. Other used information is exchanged via the Physical Layer Convergence Protocol (PLCP) header of the initiator transmitting frame I containing the length (in octets) and the data rate of the initiator transmitting frame I. Precise timing events are here derivable by correlating the long training sequence T.S. contained in the PLCP preamble thus providing the correlation signals S6 and S13 as shown in FIG. 6 at the end of the training sequence T.S. after a time delay $T_c$. The sampling rate can be set to 40 MHz corresponding to a twofold oversampling of the nominal chip duration of 50 ns providing a range resolution of approximately 7.5 m and a spatial resolution of about 3.75 m. With a correlation chip rate of 20 MHz that corresponds to a chip duration of nominally 25 ns a range resolution of approximately 15 m can be achieved. The abbreviations used in the figure denote the following: R—Reserved bits, P—Parity bit, T—Tail bits, TP—Tail & Paol bits, T.S.—Training Sequence, SIFS—Short InterFrame Space, PSDU—Protocol Service Data Unit, FCS—Frame Check Sequence.

Figure 4:
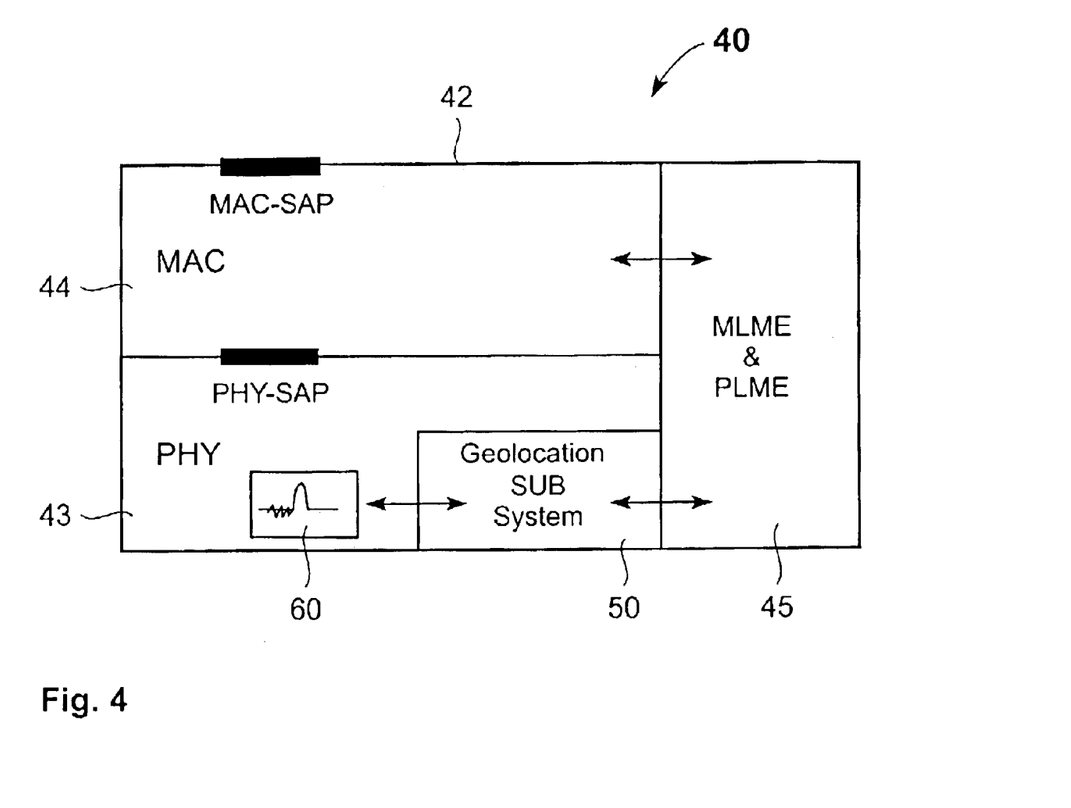
FIG. 4 shows a schematic illustration of an example embodiment of an implementation of a geolocation subsystem.

FIG. 4 shows a schematic illustration of an example implementation of a geolocation subsystem 50, also referred to as timing-control unit 50, into the IEEE 802.11 standard. The figure shows an apparatus 40 embedding the timing-control unit 50 with respect to different entities or layers, as described by IEEE 802.11 in simplified form and here represented within a general-control unit 42. The general-control unit 42 comprise here a first entity 43 indicating the Physical Layer (PHY) entity, a second entity 44 indicating the Medium Access Control (MAC) entity, and a third entity 45 indicating the MAC & PHY Layer Management Entity (MLME & PLME). The double arrows represent signals exchanged between corresponding processes and entities. The control process of the timing-control unit 50 is indicated residing in the third entity 45 (MLME & PLME). The interface between defined entities or layers for the signal flow and the exchange of service primitives is indicated as a black rectangle and labeled with MAC-SAP and PHY-SAP, respectively, where SAP stands for service access point. In addition to the described functionality for estimating the propagation time $T_p$ other functions and processes supporting an application interface can be defined.

Figure 5:
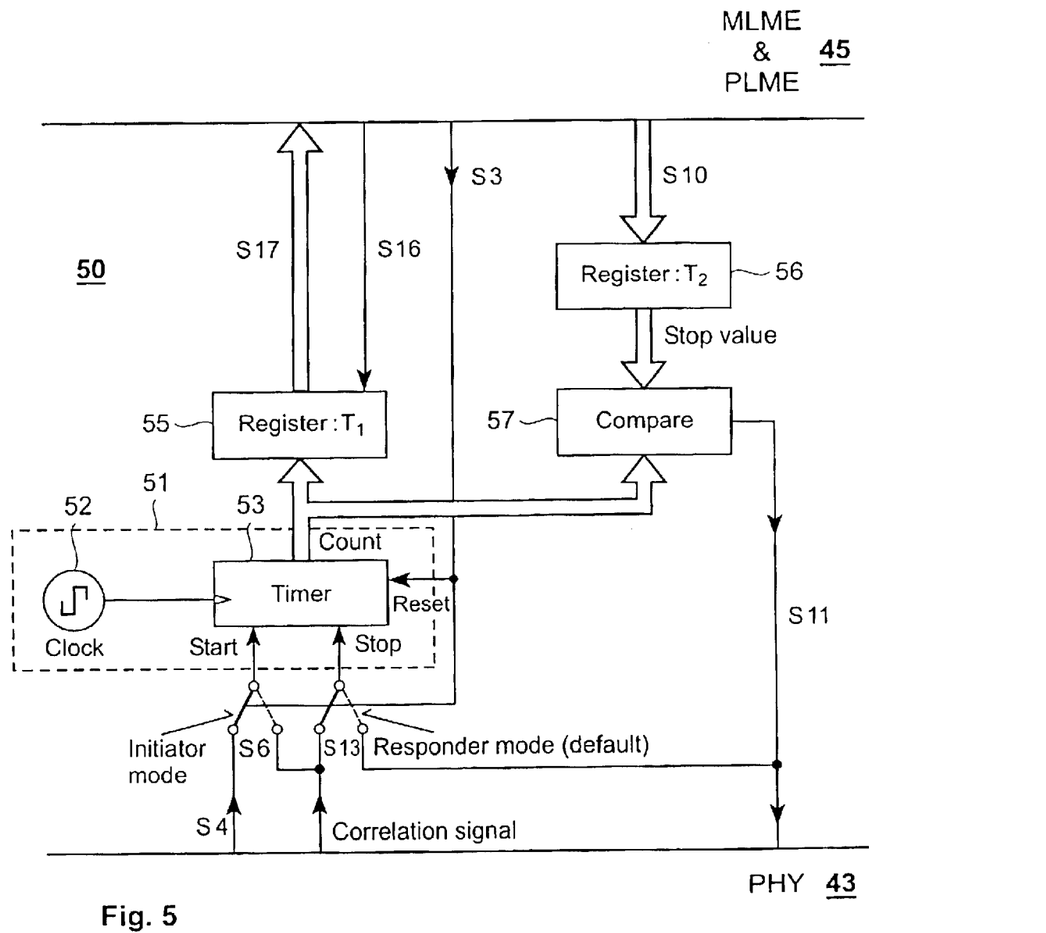
FIG. 5 shows a schematic illustration of the geolocation subsystem in more detail.

FIG. 5 shows a schematic illustration of the timing-control unit 50 in more detail for a hardware implementation. As the timing-control unit 50 can work in an initiator mode as well as in a responder mode, one design can be used to implement it into both types of stations, i.e. initiator station 1 and responder station 2. The timing-control unit 50 is able to receive in the initiator mode a fourth signal S4 and a correlation signal S13 from the first entity 43, as indicated at the bottom of the figure. The correlation signal in the responder mode is labeled with S6. Moreover, the timing-control unit 50 is able to receive a third signal S3, a tenth signal S10 that contains a stop value or remote counter value $T_2$, and a sixteenth signal S16 from the third entity 45, as indicated at the top of the figure. On the other hand, the timing-control unit 50 provides the third entity 45 with a seventeenth signal S17 that includes a local counter value $T_1$ and the first entity 43 with a eleventh signal S11. The timing-control unit 50 comprises a timing unit 51 with a clock unit 52 and a timer 53. The clock unit 52 clocks the timer 53. The timer 53 is connected to a comparator 57 generating the eleventh signal S11 and a first register 55 that is loadable with the local counter value $T_1$ provided by the timer 53. The eleventh signal S11 generated by the comparator 57 stops in the responder mode the timer 53. A second register 56 is also connected to the comparator 57, whereby the second register 56 is loaded from a scheduling means within the third entity 45 with the tenth signal S10. FIG. 5 shows the timing-control unit 50 in the initiator mode, as the switch blow the timing unit 51 is depicted. The second register 56 is not used in the in the initiator mode. That indicates that, when the apparatus 40 is used only for the purposes of the initiator station 1, the second register 56 and the comparator 57 can be omitted. When the response signal $S_{II}$ form the responder station 2 is detected the correlation signal 13 stops the timer 53. The local counter value $T_1$ is provided by the first register 55 via the seventeenth signal S17 to the third entity 45. If the switch is in the other state (indicated by dotted lines), then the timing-control unit 50 is in the responder mode, that usually is the default mode.

A responder apparatus at the responder station 2 for supporting the determination of the propagation time $T_p$ comprises at least the correlator 60 (shown in FIG. 4) for determining a timing reference within the reception of the request signal $S_I$, the timing-control unit 50 for starting the timer 53 when the request signal $S_I$ is detected, and the general-control unit 42 coupled to the timing-control unit 50 and the correlator 60. The general-control unit 42 derives from the received request signal $S_I$ the remote counter value $T_2$ that is known to the initiator station 1 based on the length and data rate used with the frame in the request signal $S_I$ and provides the derived remote counter value $T_2$ to the timing-control unit 50 in order to schedule transmission of the response signal $S_{II}$. The remote counter value $T_2$ represents an inter-time-delay between the reception of the request signal $S_I$ and the start of transmission of the response signal $S_{II}$ which remote counter value $T_2$ is known to the initiator station 1. The second register 56 stores the remote counter value $T_2$ which is used by the comparator 57 for stopping the timer 53 and providing the eleventh signal S11 after reaching the remote counter value $T_2$. The remote counter value $T_2$ is used by the comparator 57 as a stop value. To aid in the understanding of the signals, a detailed signal flow is described with reference to FIG. 6 below. The timer unit 51 operates in initiator mode as local timer 53 or in responder mode as remote timer 53 according to the settings of the respective control signals.

FIG. 6 shows a schematic illustration of a signal flow in a message sequence chart. In general, the range estimation, i.e. the determination of the propagation time $T_p$, is based on the evaluation of the timing intervals of two timers, i.e. local timer 53 at the initiator station 1 and the remote timer 53 at the responder station 2. The local timer 53 is located in the initiator station 1 measuring the time from the beginning of the first symbol of the initiator transmitting frame I transmitted to the reception of the correlation signal of the responder transmitting frame II from the responder station 2. The remote timer 53 is located in the responder station 2. It is started with the reception of the correlation signal of the initiator transmitting frame I and is stopped upon reaching a time value corresponding to the exact expiry of the short interframe space SIFS interval at which time the transmission of the first symbol of the responder transmitting frame II is started. The corresponding time value depends on the length and data rate of the initiator transmitting frame I which is conveyed to the responder station 2 via the PLCP header. Since the timing interval of the remote timer 53 is also known to the initiator station 1 the propagation time $T_p$ can be calculated from the difference of the two counter values $T_1$, $T_2$ under consideration of the known frame structure and hardware signal propagation delays $T_{td}$, $T_{rd}$, $T_c$, as explained in more detail blow.

Details of the signal and frame exchange between the initiator station 1 and the responder station 2 for estimating the propagation time $T_p$, and hence the propagation distance $S_p$, are shown with the aid of FIG. 6. For each station, i.e. the initiator station 1 and the responder station 2, the entities 43, 44, 44 representing the MAC layer, PHY layer, MAC and PHY Layer Management Entity (MLME & PLME), as well as the timing-control unit 50, labeled as geolocation subsystem, are shown as simplified processes exchanging signals S in ordered sequence:

S1: Transmit Request for transmitting the initiator transmitting frame I, hereafter called first frame I, directed to the responder station 2. Parameters: (Contents of the first frame I including SA, DA, data rate and frame length).

S2: Signal informing the third entity 45 MLME & PLME about immediate frame exchange using SIFS for measuring propagation delay. Parameters: (Contents of the first frame I including data rate and frame length).

S3: Signal for setting timing-control unit 50 to initiator mode and resetting the local timer 53.

S4: Signal for starting the local timer 53, labeled as Timer 1, when transmission of first symbol of preamble (first frame I) begins.

S5: Transmission of the first frame I. The chart traces the beginning of the first symbol with the various delays encountered up to the reception of the last symbol by the first entity 43 in a PHY process at the remote station 2.

S6: Detection of correlation signal of the first frame I. Start of the remote timer 53, labeled as Timer 2.

S7: Receive indication for the first frame I. Parameters: (Contents of the first frame I including data rate and frame length, validity of the first frame I).

S8: Transmit Request for transmitting the responder transmitting frame II, hereafter called second frame II, directed to the initiator station 1. Parameters: (Contents of the second frame II including data rate and frame length). This request is only issued if the first frame I was validly received and addressed to the responder station 2 with the indication that a response is required within a SIFS interval. Otherwise the remote timer 53 is reset.

S9: Indicate reception of the first frame I. Parameters: (Data rate and length of the first frame I).

S10: Load the second register 56 with expiration value or remote counter value $T_2$ for the remote timer 53. This remote counter value $T_2$ is calculated from data rate and length information contained in the first frame I.

S11: Initiate transmission (start first symbol) of the second frame II at expiration of the remote timer 53.

S12: Transmission of the second frame II. The chart traces the beginning of the first symbol with the various delays encountered up to the reception of the last symbol by the first entity 43 in a PHY process at the initiator station 1.

S13: Detection of correlation signal of the second frame II. Stop local timer 53 and load local counter value $T_1$ into the first register 55.

S14: Receive indication for the second frame II. Parameters: (Contents of the second frame II including data rate and frame length, validity of the second frame II).

S15: Notify status of reception of the second frame II (valid, invalid).

S16: If status of the second frame II valid, initiate transfer of the local counter value $T_1$. Reset the timing-control unit 50 and set to responder mode again.

S17: Transfer the local counter value $T_1$ to the third entity 45. Using the data rate and length information for the first frame I the propagation time $T_p$, and hence the propagation distance $S_p$ between the initiator station 1 and the responder station 2, can be calculated.

Description of time delays:

$T_{td}$: Delay of signal from PHY process to antenna (air interface).

$T_p$: Propagation delay in the medium (to be estimated).

$T_{rd}$: Delay of signal from antenna (air interface) to PHY process.

$T_c$: Duration of Physical Layer Convergence Protocol (PLCP) preamble containing short/long training sequences T.S. from begin of first symbol of preamble to generation of correlation signal S6, S13 (16 ms).

$T_r$: Remaining duration of frame from correlation signal peak to end of last symbol of frame. The value is determined from data rate and length information contained in the PLCP header according to the frame structure described in the IEEE 802.11a standard.

SIFS: Short interframe space indicating the time gap between the end of the last symbol of the previous frame and the beginning of the first symbol in the preamble of the following frame at the air interface as specified by IEEE 802.11 standard. SIFS=16 ms±0.9 μs. Here the nominal value of 16 μs is chosen (no tolerance).

$T_2$: Remote counter value representing the duration of timer period at remote timer 53, labeled in FIG. 6 as Timer 2.

$$T_2 = T_r + SIFS - T_{td} - T_{rd}$$

$T_1$: Local counter value representing the duration of timer period at local timer 53, labeled in FIG. 6 as Timer 1.

The estimated propagation delay between the initiator station 1 and the responder station 2 is then given as propagation time $T_p$ by $$T_p = 0.5(T_1 - T_2) - (T_{td} + T_{rd} + T_c),$$

and the propagation distance $S_p$ between the initiator station 1 and the responder station 2 is given by $$S_p = cT_p,$$

where c is the speed of light.

Any disclosed embodiment may be combined with one or several of the other embodiments shown and/or described. This is also possible for one or more features of the embodiments.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after either or both of the following a) conversion to another language, code or notation; b) reproduction in a different material form.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

Having thus described our invention, what we claim as new and desire to secure by Letters Patent is as follows:

1. An apparatus for determining a propagation time of a transmit signal transmittable via a channel as a request signal and a response signal, the apparatus comprising:

a timing-control unit for starting a timer providing a local counter value when transmission of the request signal begins;

a correlator for determining a timing reference within the reception of the response signal; and a general-control unit coupled to the timing-control unit and the correlator for stopping the timer in response to the detection of the timing reference by the correlator, the general-control unit is adapted to derive the propagation time of the transmit signal based on the local counter value, a remote counter value that depends on the request signal, and a determinable time-delay value, the remote counter value represents an inter-time-delay between the reception of the request signal and the start of transmission of the response signal.

2. An apparatus as recited in claim 1, wherein the timing-control unit comprises a timer unit having a clock unit that clocks the timer.

3. An apparatus as recited in claim 2, wherein the timing-control unit further comprises two registers and a comparator, one of the two registers and the comparator being connected to the timer unit.

4. An apparatus as recited in claim 1, wherein the timing-control unit has an initiator mode and a responder mode.

5. An apparatus as recited in claim 4, wherein the responder mode represents a default.

6. An apparatus as recited in claim 1, further comprising a scheduling means for scheduling transmission of the response signal upon reception of the request signal.

7. An apparatus as recited in claim 1, wherein the correlator uses a sampling frequency of at least 20 MHz.

8. A method for determining a propagation time of a transmit signal transmitted from a first location to a second location as a request signal and received as a response signal by the first location, the method comprising the step of:

determining the propagation time of the transmit signal based on a local counter value that represents the time between transmission of the request signal and reception of the response signal, a remote counter value that depends on the request signal and being known to the first location, and a determinable time-delay value, the remote counter value representing an inter-time-delay between the reception of the request signal and the start of transmission of the response signal at the second location.

9. A method for determining a propagation time of a transmit signal transmitted from a first station to a second station as a request signal and received as a response signal by the first station via a channel, the method comprising the steps of:

starting a timer providing a local counter value at the first station when transmission of the request signal begins, determining a timing reference within the reception of the response signal, stopping the timer in response to the detection of the timing reference, and deriving the propagation time of the transmit signal based on the local counter value, a remote counter value depending on the request signal and being known to the first station, and a determinable time-delay value, the remote counter value representing an inter-time-delay between the reception of the request signal and the start of transmission of the response signal at the second station.

10. A method as recited in claim 9, wherein the step of determining a timing reference within the reception of the response signal further comprises generating a correlation signal.

11. A method as recited in claim 9, further comprising for a responder mode scheduling transmission of the response signal when receiving the request signal.

12. A computer program element comprising program code means for performing a method of claim 8, when said program is run on a computer.

13. A computer program product stored on a computer usable medium, comprising computer readable program means for causing a computer to perform a method as recited in claim 8.

14. An article of manufacture comprising a computer usable medium having computer readable program code means embodied therein for causing a determination of a propagation time, the computer readable program code means in said article of manufacture comprising computer readable program code means for causing a computer to effect the steps of claim 8.

15. A program storage device readable by machine, tangibly embodying a program of instructions executable by the machine to perform method steps for determining a propagation time, said method steps comprising the steps of claim 8.

16. An article of manufacture comprising a computer usable medium having computer readable program code means embodied therein for causing a determination of a propagation time, the computer readable program code means in said article of manufacture comprising computer readable program code means for causing a computer to effect the steps of claim 8.

17. A program storage device readable by machine, tangibly embodying a program of instructions executable by the machine to perform method steps for determining a propagation time, said method steps comprising the steps of claim 8.

18. A computer program product comprising a computer usable medium having computer readable program code means embodied therein for causing a determination of a propagation time, the computer readable program code means in said computer program product comprising computer readable program code means for causing a computer to effect the functions of claim 1.

* * * * *